United States Patent Office 3,177,152
Patented Apr. 6, 1965

3,177,152
METHOD FOR THE PREPARATION OF A MOLECULAR SIEVE-PLATINUM CATALYST
Kenneth K. Kearby, Watchung, N.J., assignor to Esso Research and Engineering Company, a corporation of Delaware
No Drawing. Filed Aug. 31, 1962, Ser. No. 220,868
1 Claim. (Cl. 252—455)

This invention relates to catalytic oxidation of combustible gases. Specifically, this invention pertains to a method especially adapted to the oxidation of carbon monoxide and particularly to the treatment of exhaust gases from internal combustion engines to effect combustion of the carbon monoxide and other combustible constituents. More specifically this invention relates to the use of metal or metal oxide oxidative catalysts supported within crystalline aluminum silicate molecular sieves as effective catalysts for the oxidation of automotive exhaust gases.

The extremely severe conditions which prevail in the catalytic oxidation of carbon monoxide and hydrocarbons contained in the exhaust gases from internal combustion engines set unusually severe criteria for such catalysts which makes the selection of an effective catalyst extremely difficult. It is generally agreed that an effective catalyst should exhibit the following properties:

(a) Catalyst should be effective at a relatively low temperature so that it will function soon after the motor has started, i.e., it must have a short warm-up period.
(b) It should be highly efficient in oxidizing exhaust hydrocarbons, carbon monoxide and other partial combustion products.
(c) It should have a long life, i.e.,
   (1) It should not be easily poisoned.
   (2) It should withstand at least 1400° F. likely to develop during operation.
   (3) It should not be abraded during the continual shaking and occasional shocks characteristic of a moving vehicle.

Extensive research in this field has revealed that many catalysts will effectively oxidize the carbon monoxide and hydrocarbons contained in the exhaust gas from internal combustion engines. However, these catalysts have uniformly failed to be economically feasible in automotive afterburners due to their short life. The primary reason for this short life has been the ease with which these catalysts have been poisoned by the metallic compounds contained in the exhaust gases. Especially potent as a poison are the lead compounds formed from the antiknock additives in the fuel.

It is therefore an object of the present invention to provide a method of catalytically oxidizing combustible gases and vapors, especially those gases from the exhaust of internal combustion engines.

It is a further object to provide oxidation catalysts for the practice of such a method, which catalysts have comparatively long lives due to their resistance to poisons contained in the exhaust gases.

These and other objects will appear more clearly from the detailed specification and claims which follow.

It has now been found that catalysts which are particularly suited for the oxidation of exhaust gas are made by incorporating active components such as Pt, Pd, Rh, Cu, Cr, Ag, Co, V etc. either individually or in combination inside the pores of a crystalline aluminum silicate molecular sieve having uniform pore opening diameters of about 4 to about 13 Angstrom units. It is preferable that the pore size of this sieve be within the range of 10–13 angstroms.

The molecular sieves retain a considerable amount of lead on their outer surfaces and thus are good lead guards. It is, therefore, possible to employ them also as lead guards while using other catalysts to effect the combustion of the gases.

The method and catalyst composition of the present invention may be further illustrated by the following specific examples.

EXAMPLE 1

A Linde 13X Molecular Sieve, consisting of ⅛ inch extruded pieces, was allowed to soak in a dilute $PtCl_4$ solution overnight and then was washed to remove any soluble platinum. The washed product was dried at 350° F. and then was calcined for 3 hours at 1000° F. The resulting catalyst composition contained about 0.1% Pt.

EXAMPLE 2

Various catalyst compositions were made by the overnight soaking of 500 gram batches of Linde 13X Molecular Sieve (⅛ inch extruded pieces) in one liter of solution containing the following soluble salts:

(a) 216 grams of $Co(NO_3)_2 \cdot 6H_2O$;
(b) 24.6 grams of $AgNO_3$ and 175 grams of $Cr(NO_3)_3 \cdot 9H_2O$;
(c) 43 grams of $Cu(NO_3)_2 \cdot 6H_2O$ and 155 grams of $Cr(NO_3)_3 \cdot 9H_2O$;
(d) 221 grams of $AgNO_3$;
(e) 258 grams of $Cu(NO_3)_2 \cdot 6H_2O$.

The respective catalyst compositions were washed thoroughly to remove all soluble compounds and were then dried. Finally, they were calcined three hours at 800–1000° F.

EXAMPLE 3

A total of 700 cc. or 431 grams of Linde 13X Molecular Sieve was soaked in 2 liters of distilled water. The water was drained and the sieve was then soaked for sixteen hours in 500 cc. of an aqueous solution containing 10.5 grams of hydrazine hydrochloride. This procedure effected the exchange of hydrazine ions for some of the sodium ions originally inside the sieve pores. The sieve was washed thoroughly to remove soluble reducing agent, and then was soaked in 1200 cc. of solution containing 1.09 grams of $PtCl_4$. After standing 60 hours the impregnated sieve was drained and thoroughly washed during which time the amount of platinum removed was measured. It was found that the net amount of platinum remaining in the sieve was 0.06%. This procedure was designed to effect reduction of the $PtCl_4$ by hydrazine at the exchange positions inside the sieve pores, and to insure having a maximum concentration of platinum inside the sieve pore openings. The use of hydrazine in this example is not intended to be restrictive. Substituted hydrazines such as aryl, e.g. phenylhydrazine and alkyl, e.g. methylhydrazine can be used also. A catalyst composition thus recovered is the molecular sieve containing 0.05 to 5% by weight of the platinum inside its pores.

It will be understood that other salts of active metals may be used. For example platinum or rhodium sulfates or amino nitrites may exchange directly with the sodium or calcium ions in molecular sieves. When the nitrates are excessively acidic, for example chromium nitrate, one may use less acidic compounds such as the basic nitrate, the acetate, the formate, etc. Sulfates and chlorides of Cu, Cr, Co, and Mn may also be used instead of the nitrates. However, the nitrates of Cu, Ag and Co are very suitable.

In the practice of the method provided by the invention the exhaust gases from an internal combustion engine are passed through a bed of granules of the catalyst to bring it up to starting temperature, and in the presence of oxygen it then begins to function at high efficiency. The exhaust gases being mixed with air in an amount at least corresponding to that theoretically necessary, the catalyst causes continuous and extensive combustion of all the combustible constituents of the gases. Whether the engine be operated continuously over very long periods of time, or whether operated intermittently for long or short periods of time, the catalyst retains good efficiency even though it is exposed to large amounts of lead and other catalyst poisons contained in the exhaust gases.

The method was evaluated employing catalysts described in the above examples. A feed comprising 2.4% CO, 0.17% isobutane and 3.0% $O_2$ in nitrogen was passed at a rate of 10,000 v./v./hr. S.T.P. over the catalysts at 1100° F. Conversions were determined before and after the addition of 0.5 gram of lead bromide to the catalyst. Results are summarized in Table I.

*Table I*

| Catalyst on 13X Molec. Sieve Exchanged with— | Percent Conversion at 1,100° F. and 10,000 v./v./hr. | | | |
|---|---|---|---|---|
| | No $PbBr_2$ | | +0.5 g. $PbBr_2$ | |
| | CO | $iC_4$ | CO | $iC_4$ |
| $PtCl_4$ | 100 | 97 | 100 | 68 |
| Hydraz.+$PtCl_4$ | 98 | 100 | 98 | 60 |
| Cu+Cr | 83 | 97 | 83 | 84 |
| Ag+Cr | 62 | 96 | 50 | 81 |
| Cu | 100 | 74 | 88 | 36 |
| Co | 9 | 9 | 23 | 73 |
| Ag | 18 | 39 | 12 | 33 |

The above results show that copper and chromium on the 13X Molecular Sieve retained the most activity for oxidation of isobutane after the relatively large amount of lead bromide was added to the catalyst. The cobalt catalyst apparently may be activated by a reduction treatment, but in such experiments as have been tried it did not maintain the increased activity under oxidizing conditions. Catalysts exchanged with platinum also are found to have good activity and resistance to poisoning by lead. It has also been found that rhodium exchanged catalysts are very effective.

The advantages of ease of use, cheapness and long life make the method provided by the invention particularly useful in the treatment of exhaust or stack gases and especially of internal combustion engine exhaust gases. However, the invention is equally applicable for other purposes where an oxidation catalyst is needed, and other applications than that referred to specifically will suggest themselves to those skilled in the art.

What is claimed is:

An improved method for the preparation of a catalyst which comprises:
(1) wetting and soaking a crystalline aluminum silicate molecular sieve having uniform pore opening diameters of about 4 to about 13 Angstrom units in an aqueous solution containing hydrazine hydrochloride to effect an exchange of hydrazine ions for sodium ions inside the sieve pores,
(2) washing and draining the sieve containing the exchanged hydrazine ions to remove unexchanged hydrazine hydrochloride from the sieve,
(3) soaking the sieve containing the exchanged hydrazine ions in a solution of $PtCl_4$,
(4) effecting reduction of the $PtCl_4$ to platinum inside the sieve pores by the exchanged hydrazine therein,
(5) washing the sieve and draining solution of unreacted platinum chloride from the sieve containing the reduced platinum inside its pores, and
(6) recovering as a resulting catalyst composition the molecular sieve containing 0.05 to 5% by weight of the platinum inside its pores where the hydrazine ions were exchanged for the sodium ions and $PtCl_4$ was reduced.

References Cited by the Examiner

UNITED STATES PATENTS

| | | | |
|---|---|---|---|
| 2,475,155 | 7/49 | Rosenblatt | 252—460 |
| 2,912,300 | 11/59 | Cannon et al. | 23—2 |
| 2,967,159 | 1/61 | Gladrow et al. | 252—455 |
| 3,013,984 | 12/61 | Breck | 252—455 |
| 3,013,987 | 12/61 | Castor et al. | 252—455 |
| 3,086,839 | 4/63 | Bloch | 23—2 |

FOREIGN PATENTS 620,028  5/61  Canada.

MAURICE A. BRINDISI, *Primary Examiner.*